Nov. 6, 1962 W. H. GILLILAND 3,062,936

CIRCUIT ELEMENT REMOVAL EQUIPMENT

Filed March 8, 1960 6 Sheets-Sheet 1

INVENTOR
William H. Gilliland

BY Strauch, Nolan & Neale

ATTORNEYS

Nov. 6, 1962 W. H. GILLILAND 3,062,936

CIRCUIT ELEMENT REMOVAL EQUIPMENT

Filed March 8, 1960 6 Sheets-Sheet 2

INVENTOR
William H. Gilliland

BY Strauch, Nolan + Neale

ATTORNEYS

Nov. 6, 1962 W. H. GILLILAND 3,062,936

CIRCUIT ELEMENT REMOVAL EQUIPMENT

Filed March 8, 1960

6 Sheets-Sheet 3

INVENTOR
William H. Gilliland

BY Strauch, Nolan & Neale

ATTORNEYS

Nov. 6, 1962 W. H. GILLILAND 3,062,936

CIRCUIT ELEMENT REMOVAL EQUIPMENT

Filed March 8, 1960 6 Sheets-Sheet 4

INVENTOR
William H. Gilliland

BY Strauch, Nolan & Neale

ATTORNEYS

Nov. 6, 1962 W. H. GILLILAND 3,062,936

CIRCUIT ELEMENT REMOVAL EQUIPMENT

Filed March 8, 1960 6 Sheets-Sheet 5

INVENTOR
William H. Gilliland

BY Strauch, Nolan & Neale

ATTORNEYS

CIRCUIT ELEMENT REMOVAL EQUIPMENT

Filed March 8, 1960
6 Sheets-Sheet 6

INVENTOR
William H. Gilliland

BY Strauch, Nolan & Neale
ATTORNEYS

United States Patent Office 3,062,936

Patented Nov. 6, 1962

3,062,936

CIRCUIT ELEMENT REMOVAL EQUIPMENT

William H. Gilliland, Birmingham, Ala., assignor to USCD Power Equipment Corporation, Birmingham, Ala., a corporation of Alabama Filed Mar. 8, 1960, Ser. No. 13,557
16 Claims. (Cl. 200—114)

The present invention relates to improved equipment and methods for safely bypassing and reconnecting normally in circuit connected electrical power distribution service pole mounted circuit devices, such as reclosers and voltage regulators, during the service maintenance of such devices in circuits in which the customer service will not permit interruption of the circuit.

A recloser is a protective device operative to open a faulty circuit and remain open for a predetermined amount of time and then reclose the circuit. If the circuit is still faulty, the recloser operates again; usually they are set to operate two or three times and then lock open if the circuit has not been cleared. A voltage regulator is a device that functions to maintain a designed characteristic at a predetermined value. In other words, the voltage is regulated up or down according to the setting of the regulator to maintain the desired voltage in the circuit. In electrical power distribution networks, these circuit devices are normally mounted upon the service poles slightly below the cross arms. Such devices are normally quite intricate mechanisms and their proper and relatively frequent maintenance is essential for their successful operation. In circuits where the customer service will not allow an interruption of the circuit, it has been customary heretofore for the maintenance crew to use a pair of hot line clamps electrically interconnected by a jumper to shunt the circuit device so that the circuit device can be removed from the circuit for maintenance purposes without interruption of the circuit. The act of making the connection of this shunt across these circuit devices is a very hazardous operation. Men have been killed attempting to make this connection despite rigorous safety training programs of the electrical utility companies.

The primary object of the present invention is therefore to provide improved equipment and methods by which such circuit devices can be removed from the circuit without interruption of the circuit and without hazard to the safety of the maintenance personnel.

More specifically it is an object of the present invention to provide improved equipment and procedures by which such circuit devices can be removed from the circuit by closing a bypass switch device, the terminals of which are permanently connected in the line, and by manipulation of easily manipulatable detachable clamping terminals normally attached to the opposite terminals of such switch and electrically connected to the terminals of such circuit device.

A further specific object of this invention is to provide improved equipment including a bypass switch device having its terminals permanently connected in the circuit and its terminals adapted to receive easily manipulatable clamp end terminals of the leads to such a circuit device and in which the clamps of such circuit device are adapted to be readily clamped together upon disconnection of either clamp from the associated switch terminal to which it is normally connected, to thereby assure freedom of such circuit device from any applied voltage differential across its terminals before actual maintenance is initiated.

As will become apparent, the switch device in accord with this invention may be either a high load capacity switch or a cutout fuse used as a switching device. The latter has the advantage of assuring that the circuit is protected against overload while the recloser is out of the circuit for maintenance purposes.

These and other objects of the present invention will become more fully apparent by reference to the appended claims and as the following detailed description proceeds in reference to the accompanying drawings wherein:

Figure 1:
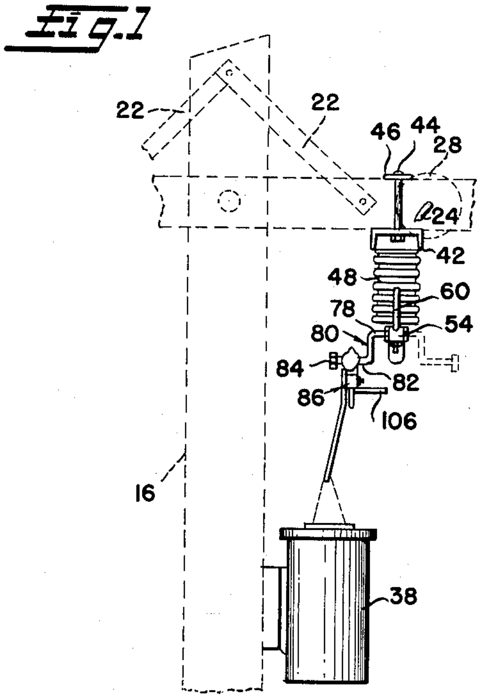
FIGURE 1 is an end view of a removable blade cross arm mounted bypass switch assembly in its installed position on an electrical service pole connected in shunt to a recloser mounted on the service pole and illustrated with its blade removed.
Figure 2:
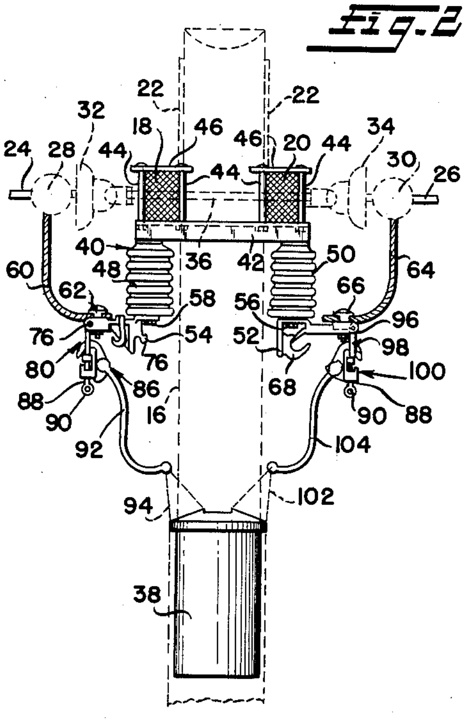
FIGURE 2 is a side elevational view of the structure illustrated in FIGURE 1.
Figure 3:
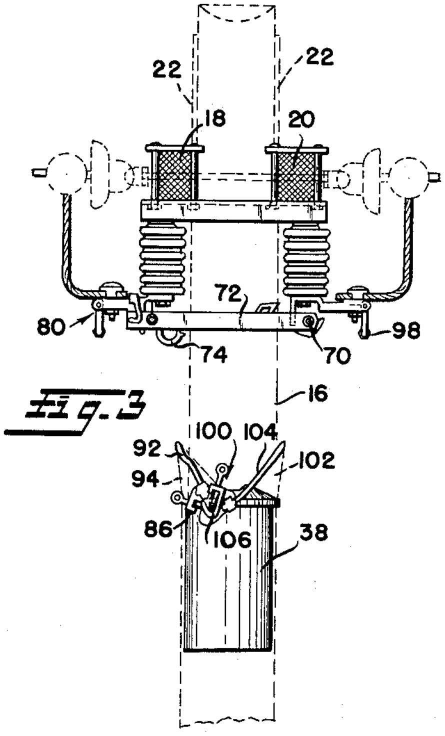
FIGURE 3 is a view similar to FIGURE 2 illustrating the structure of FIGURES 1 and 2 with the disconnect bypass switch in circuit and the recloser terminals disconnected from the line and connected together.

Referring now to the drawings and particularly to FIGURES 1, 2 and 3, there is therein illustrated a conventional service pole 16 having conventional wooden cross arms 18 and 20 connected thereto and supported therefrom by angularly extending braces 22. The main line wires 24 and 26 are connected to conventional terminal line end connectors 28 and 30, respectively, which are respectively supported by ceramic insulators 32 and 34 interconnected by an end eye equipped tie bolt 36 extending through the cross arms 18 and 20, as shown in FIGURE 2. The circuit device 38, which in the illustrated embodiment, is a recloser and is mounted upon the service pole 16 beneath the cross arms 18 and 20 in the conventional position as shown.

Mounted upon the service pole 16 and extending between and fixed to the cross arms 18 and 20 adjacent their outer ends is a bypass switch assembly 40. Switch assembly 40 includes a base plate 42, which is preferably of inverted channel shape in cross section as illustrated in FIGURE 1, and which is fixed to the cross arms 18 and 20 by bolts 44 and clamping plates 46. Fixed to and depending from the opposite ends of the support member 42 are ceramic insulator spacers 48 and 50. Secured to the lower end of the insulator 50 is a pivot terminal member 52 and to the lower end of the insulator 48 is a disconnect terminal member 54 by bolts 56 and 58, respectively. The terminal members 52 and 54 are preferably machined castings of a good electrical conductive material such as bronze. Member 54 is electrically connected to the terminal 28 by a cable 60 constituting the end portion of wire 24 which at its lower end is clamped to the terminal member 54 by a conventional nut actuated eye bolt clamp 62. Similarly, the terminal member 52 is connected to the terminal 30 by a cable 64 preferably constituting an end portion of wire 26 which has its end fixed to the terminal member 52 by a nut actuated eye bolt type clamp 66.

Figure 7:
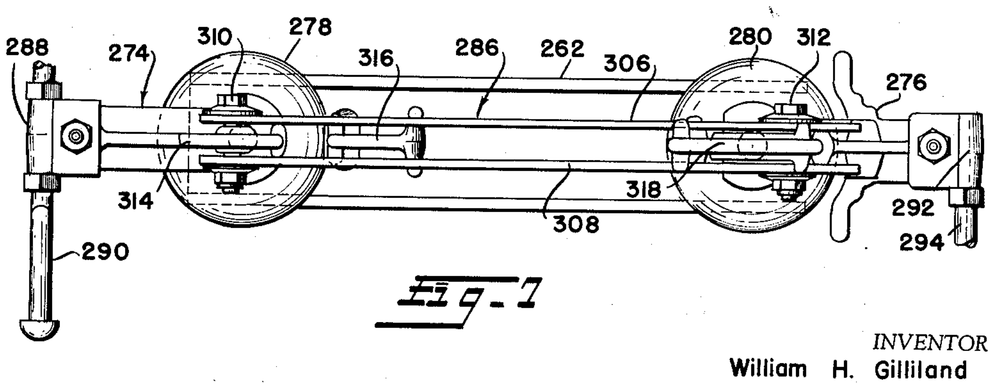
FIGURE 7 is a bottom plan view of a removable blade hot line clamp stirrup equipped bypass switch constructed in accord with the principles of the present invention.

As is best understood from a comparison of FIGURES 2 and 3, the hook portion 68 of terminal member 52 is adapted to receive the pivot 70 of a parallel bar type blade 72 similar to that shown in FIGURE 7, the hook 68 pivotally receiving pivot 70 and being received between the bars of the blade 72. The blade 72 is provided with a conventional pivoted closing ring 74 and a coacting conventional pryout lever latch (not shown) which coacts with the projection 76 to lock and unlock the blade in and from its horizontal closed position as illustrated in FIGURE 3. The removable blade type switch as illustrated in FIGURES 1 through 3 constitutes a preferred embodiment of this invention in that it makes it impossible for all, other than authorized maintenance personnel, to shunt out of the circuit the circuit device 38, the blade being removed by and taken away with the maintenance personnel when maintenance has been completed.

The outer end of the terminal member 54 is provided with a transverse threaded bore 76 which receives the threaded end of the upper arm 78 of a generally Z-shaped stirrup 80. Stirrup 80 has a lower horizontal arm 82 which terminates in an enlarged head 84. As is apparent in FIGURES 1 and 2, the horizontal arm 82 with its head 84 provides a clamping element to which a substantially conventional hot wire clamp 86, having a screw clamp 88 provided with an apertured eye 90 at its lower end to receive a standard hook stick, may be readily secured. The hot wire clamp 86 is fixed to the free end of a cable 92 which at its other end is fixed to the terminal 94 of the circuit device 38.

The terminal member 52 is provided with a similar threaded through bore 96 receiving a similarly shaped stirrup 98 to which a hot wire clamp 100, identical to hot wire clamp 86, may be readily attached. Hot wire clamp 100 is connected to the terminal 102 of the circuit device 38 by a cable 104. Each of the hot wire clamps 86 and 100 is provided with a laterally projecting stud 106 as is illustrated in FIGURE 1 in connection with hot wire clamp 86.

With the circuit device 38 connected in circuit with the wires 24 and 26 as illustrated in FIGURE 2, the disconnect procedure is to place the blade 72 upon a conventional grip-all clamp or bayonet type hook stick, hook its pivot 70 over the hook 68 of the terminal member 52, and then, by insertion of the hook stick end in the closing ring 74, pivot the blade 72 to its horizontal closed position and lock it as shown in FIGURE 3. When the blade 72 is closed, the circuit device 38 is electrically shunted by the blade 72 and the terminal members 54 and 52. Following closing of the blade 72 to its position illustrated in FIGURE 3, the recloser is manually tripped open and then one of the hot wire clamps 86 and 100 is unclamped from the associated one of the stirrups 80 or 98 by manipulation of the screw 88 thereof by a hook stick hook inserted in the eye 90 and that clamp is then clamped to the projecting stud 106 on the other hot wire clamp which has not been disconnected. After this has been accomplished, the remaining hot wire clamp is unclamped from the stirrup to which it is attached in the same manner permitting the two connected clamps to be lowered to the position illustrated in FIGURE 3. By this equipment and procedure it is assured that at no time are there any potentially dangerous dangling electrically hot leads as would exist if the two hot wire clamps 86 and 100 were not connected together before disconnection of the last to be disconnected of these clamps. This procedure is reversed after maintenance is completed to restore the recloser 38 to the circuit.

Figure 4:
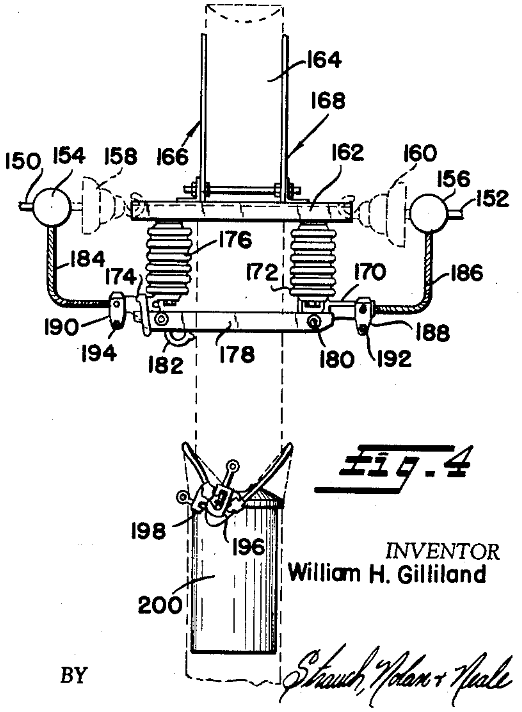
FIGURE 4 illustrates a permanent blade type bracket mounted bypass switch mounted upon a service pole in operative association with a recloser and with its blade in circuit and the terminals of the recloser removed from their connection to the bypass switch and connected together.

FIGURE 4 illustrates the application of the invention to a permanent blade type bracket mounted switch assembly. In this embodiment, the transmission lines 150 and 152 are connected by line terminal end connectors 154 and 156 connected to ceramic insulators 158 and 160 which in turn are connected to the opposite ends of a channel shaped support member 162 suspended at the side of a pole 164 by brackets 166 and 168. The pivot switch terminal member 170 is fixed to the lower end of a ceramic insulator spacer 172 which is fixed to the right hand end of the bracket member 162 as illustrated in FIGURE 4. Similarly the disconnect switch terminal member 174 is fixed to the lower end of a ceramic spacer insulator 176 which, at its upper end is fixed to the opposite end of the bracket member 162. The switch terminal members 170 and 174 are electrically interconnectable by a blade 178 permanently pivoted at 180 upon pivot terminal member 170 and movable by manipulation of the closing ring 182 into and out of locking engagement with the disconnect terminal member 174 by actuation of a conventional pry-out lever latch (not shown). Terminal member 174 is electrically connected to the terminal 154 by a cable 184, preferably instituting the end portion of wire 150, and the terminal member 170 is connected to the terminal 156 by cable 186, preferably constituting the end portion of wire 152. Fixed to the outer end of the switch terminal members 170 and 174 are depending brackets 188 and 190 which support transversely extending stirrup bolts 192 and 194 respectively to which the hot wire clamps 196 and 198 of the circuit device 200 may be attached in substantially the manner as the hot wire clamps 86 and 100 are attached to the stirrups 80 and 98 in the embodiment of FIGURES 1–3. In FIGURE 4, the hot wire clamps 196 and 198 are shown interconnected to each other in the same way that they are illustrated in FIGURE 3, being of identical construction to the hot wire clamps of that embodiment. The detail of construction of the end portions of terminal members 170 and 174 and of the depending brackets 188 and 190 are substantially identical with the structure illustrated in FIGURES 11 and 12, which will be described in detail herein presently.

Figure 5:
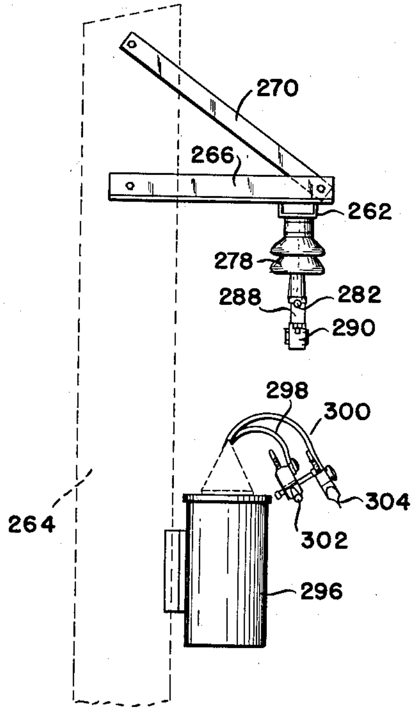
FIGURE 5 is an end view of a permanent blade bracket mounted bypass switch illustrated with its blade closed and the terminals of the associated service pole mounted recloser removed from their line connection.
Figure 6:
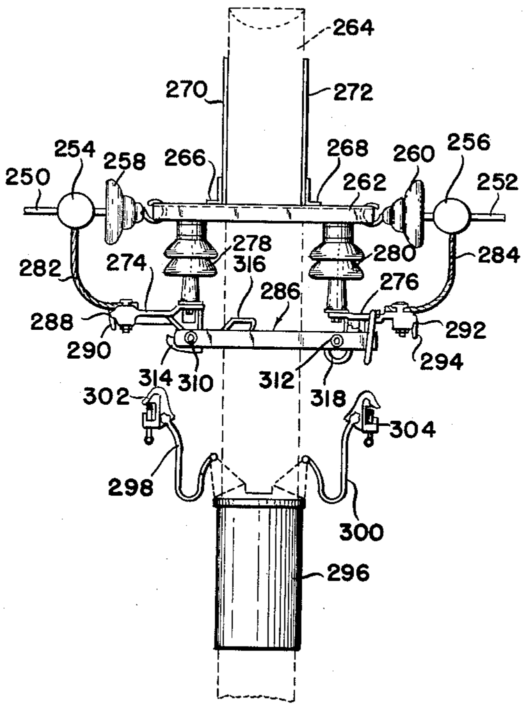
FIGURE 6 is a side elevational view of the structure illustrated in FIGURE 5.
Figure 8:
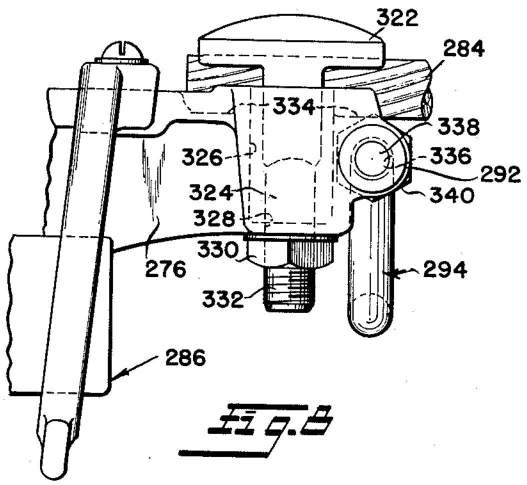
FIGURE 8 is a fragmentary side elevational view of the right end of the bypass switch illustrated in FIGURE 7.
Figure 9:
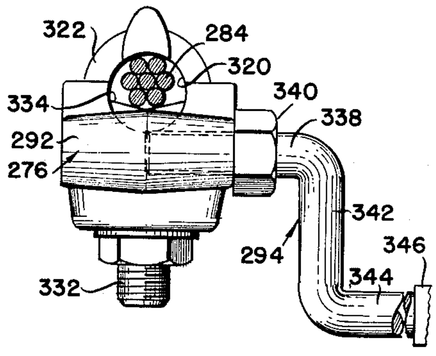
FIGURE 9 is a right end elevational view of the structure illustrated in FIGURE 8.

The embodiment illustrated in FIGURES 5–9 embodies a bracket mounted removable blade by-pass switch. The line wires 250 and 252 are connected to terminal line connectors 254 and 256 supported upon ceramic insulator spacers 258 and 260 secured to the opposite end of a by-pass switch base bracket 262 which is supported from the pole 264 by horizontally extending brackets 266 and 268 each of angle shaped in cross-section and angularly inclined brackets 270 and 272 as illustrated in FIGURES 5 and 6. The switch terminal members 274 and 276 are fixed to the lower end of pedestal type ceramic insulators 178 and 280 which are fixed at their upper ends to the opposite ends of the base bracket 262 as illustrated in FIGURE 6. The switch terminal member 274 is connected to the terminal line connector 254 by a cable 282, preferably an end portion of wire 250, and the terminal member 276 is connected to the terminal line connector 256 by a cable 284, preferably an end portion of wire 252. The switch terminals 274 and 276 are interconnectable by a removable blade assembly 286, the construction of which is best illustrated in FIGURE 7. The terminal member 274 is provided with an integral outwardly extending boss 288 provided with a transverse through threaded aperture receiving the threaded end of a generally Z-shaped stirrup 290 and the terminal member 276 is similarly provided with an outwardly extending integral boss 292 provided with a through threaded aperture receiving the threaded end of a Z-shaped stirrup 294, the details of construction of which are best illustrated in FIGURES 8 and 9. The construction of the end portion of terminal member 276, which is connected to the cable 284 and which is provided with boss 292, is substantially identical with the corresponding structure at the opposite end of the switch terminal member 274.

The circuit device 296 attached to the pole 264 has spaced leads 298 and 300 provided with hot wire clamps 302 and 304 which are substantially identical in construction to those shown in detail in connection with the embodiment of FIGURES 1–3 and which are adapted for connection to the horizontally extending end regions of the stirrups 290 and 294 in substantially the same manner as the corresponding components of the FIGURE 1–3 embodiment, herein above described in detail.

As is best illustrated in FIGURE 7, the blade assembly 286 comprises a pair of parallel metal bars 306 and 308 clamped together at their ends by bolts 310 and 312 and maintained in spaced relation by collars surrounding the bolts 310 and 312 between them. The hook portion 314 of terminal member 274 is adapted to be received between the plates 306 and 308 around the collar surrounding the bolt 310 to provide a pivot for the blade assembly 286. A ring 316 (see also FIGURE 6) is fixed between the plates 304 and 308 adjacent the bolt 310 and is adapted to receive either a "grip-all" clamp or a bayonet type hook stick to permit lifting of the blade, while in a substantially vertical position into and out of pivotal engagement with the hook portion 314 of the terminal member 274. At its opposite end, the blade 286 is provided with a closing ring 318 and a coacting conventional pry-out lever latch by which that end of the blade assembly 286 is connected or disconnected from the terminal member 276.

Referring to FIGURES 8 and 9, it will be seen that the line cable end portion 284 extends through the eye 320 of an eye bolt 322. The stem 324 of bolt 322 extends downwardly through a recess 326 formed through the top of the switch terminal member 276 and through an end aperture 328 and receives a clamping nut 330 upon its threaeded lower end portion 332. The top surface of the terminal member 276 is formed with a shallow V groove 334 at opposite sides of the recess 326 providing a cradle for the cable end portion 284 against which the cable end portion 284 is clamped by manipulation of the nut 330 to draw the eye bolt 332 tightly against the cable end portion 284.

The integral boss 292 is formed on the member 276 to the right of the recess 326 as viewed in FIGURE 8 and is provided with a threaded through aperture 336 which receives the threaded end portion 338 of the generally Z-shaped stirrup 294 which is firmly fixed in position relatively to the boss 292 by a lock nut 340. The Z-shaped stirrup 294 comprises the horizontally extending threaded portion 338, a right angularly related intermediate portion 342, and a horizontal portion 344 extending parallel to the portion 338 and terminating in an enlarged head 346. It will be noted that the connection of cable end portion 284 to the switch terminal member 276 is completely independent of the mounting of the stirrup 294 and that hot wire clamps can be connected to the horizontal portion 344 of the stirrup 294 without in any way interfering with or requiring operation of the clamp for the connection between the cable 252 and the switch end terminal 276. This is an important safety feature of the present invention found in all embodiments.

Figure 10:
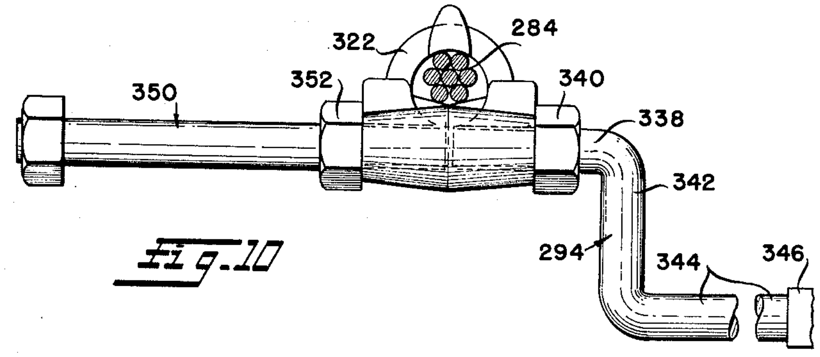
FIGURE 10 is a view similar to FIGURE 9 illustrating a modification of the structure in FIGURE 9 for special applications when hot line connections for both leads are desired.

As has been explained, the bore 336 is a through bore and threaded along its entire length. The length of the threaded portion 338 of the stirrup 294 is however such that it is screwed into the threaded bore 336 only approximately half its length. The threaded through bore construction permits attachment of the stirrup 294 at either end of the bore 336 in accord with the requirements of a particular installation. In addition, as is illustrated in the FIGURE 10, it is possible to thread a further stirrup 350 into the opposite end of the bore 336 and clamp the stirrup in such position by a further lock nut 352. This further stirrup 350 is utilized in installations where the utility prefers to use a hot wire clamp equipped jumper as a further shunt to the by-pass switch as a further precaution.

Figure 12:
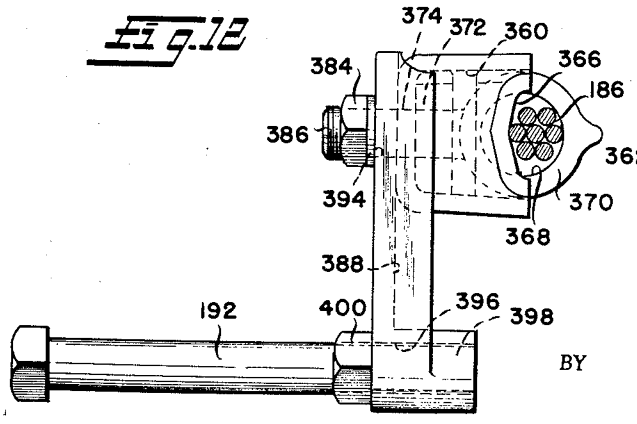
FIGURE 12 is an end view of the structure illustrated in FIGURE 11.
Figure 11:
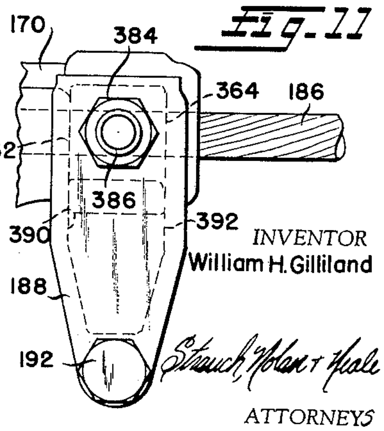
FIGURE 11 is a view similar to FIGURE 8 illustrating the connection of a hot line stirrup to the pivot end terminal assembly of a permanent blade bypass switch of the type illustrated in FIGURE 4.

As previously indicated, FIGURES 11 and 12 show in detail the end construction of the stirrup mounting for the terminal elements of a permanent blade by-pass switch such as that illustrated in FIGURE 4. The end region of the terminal member, such as 170 of such a switch, is provided with an enlarged boss formed with an internal recess 360 and opposed side faces 362 and 364. The spaced side edges of the recess 360 provide a shallow V-shaped groove 366 forming a cradle for the cable 186 extending transversely across the recess 360 and through the eye 368 of eye bolt 370, the stem 372 of which extends through the recess 360 and through an aperture 374 in the end wall thereof to receive a lock nut 384 on the outwardly projecting threaded end 386 thereof. The depending bracket 188 has a channel 388 formed in its face adjacent the terminal member 170 and having spaced side walls 390 and 392 straddling and closely interfitting with the external side wall 362 and 364 of the boss upon the terminal member 170. Depending bracket 188 is provided with a through aperture 394 through which the end of the eye bolt 370 extends so that the depending member 188 is clamped against the boss by the eye bolt 370 and the nut 384 and held against rotation by the interfitting relationship of its channel side walls 390 and 392 with the side walls 362 and 364 of the boss on the terminal member 170. The lower end of depending member 388 is formed with a through threaded aperture 396 receiving the threaded end portion 398 of the hot wire clamp receiving stirrup member 192, which is fixed thereto by a lock nut 400.

Figure 13:
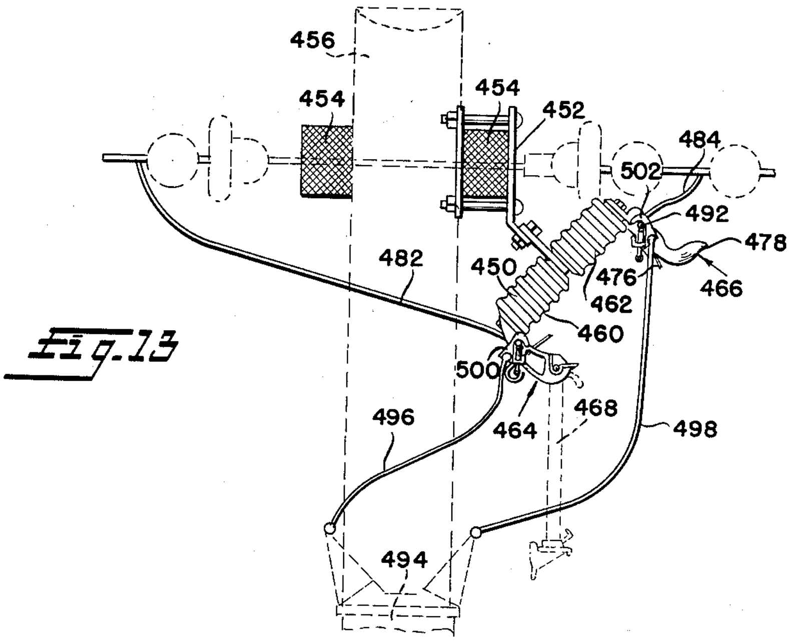
FIGURE 13 is a diagrammatic illustration of a hot line clamp stirrup equipped cut-out fuse type bypass switching device connected with a recloser in circuit.
Figure 14:
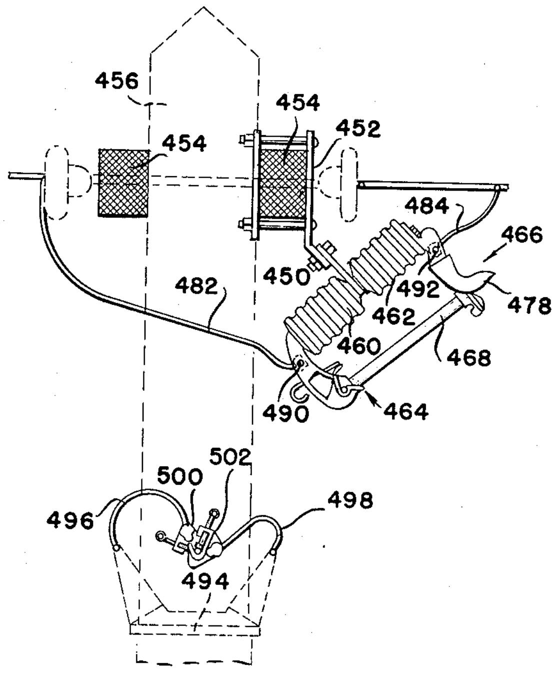
FIGURE 14 is a view similar to FIGURE 13 showing the switching device closed and the recloser out of the circuit.
Figure 15:
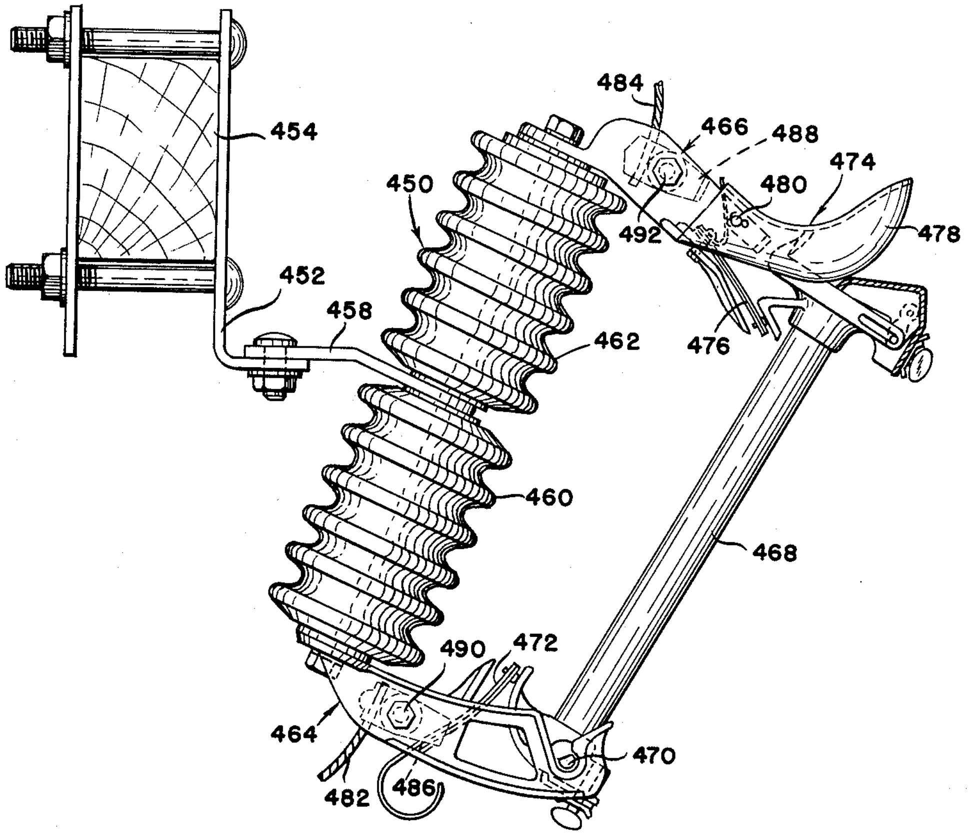
FIGURE 15 is a view showing the details of the cut-out fuse type bypass switching device.

FIGURES 13, 14 and 15 illustrate the utilization of a cut-out fuse type by-pass switching device in accord with the principals of the present invention. As is shown in FIGURE 13, a cut-out fuse type by-pass switching device 450 is mounted upon a bracket 452 fixed to one of the cross-arms 454 mounted on a service pole 456. As is more clearly shown in FIGURE 15, the switching device 450 comprises a central support bracket 458 having oppositely extending ceramic insulator spacers 460 and 462 fixed thereto, a metal pivot terminal assembly 464 fixed to the free end of insulator 460 and a metal latch terminal assembly 466 fixed to the free end of insulator 462. Terminal assemblies 464 and 466 are selectively electrically interconnectable by a cut-out fuse 468 removably pivoted upon terminal assembly 464 at 470 and resiliently biased in a clockwise direction as viewed in FIGURE 15 by a spring contact 472. When in its closed position, cut-out fuse 468 is held in the position shown in FIGURE 15 by a latch mechanism 474 where it is in engagement with a spring contact 476. Fuse 468 is released from its position as shown in FIGURE 15 by imparting counterclockwise movement to member 478 about its pivot 480 to release latch 474.

The ends of the transmission lines 482 and 484 are connected respectively to the terminal assemblies 464 and 466 on the rear side thereof as viewed in FIGURE 15 by clamps 486 and 488. Projecting from the front side of the terminal assemblies 464 and 468 as viewed in FIGURE 15, are hot wire clamp receiving stirrups or studs 490 and 492 which are of the substantially same construction as the hot wire clamp receiving stirrups of the previous embodiment.

Referring again to FIGURE 13, a recloser 494 having leads 496 and 498 extending from the terminals thereof is connected to the lines 482 and 484 by connection of the hot wire clamps 500 and 502 to the stirrups 490 and 492 respectively. With the hot wire clamps 500 and 502 so connected, the cut-out fuse may be released to swing to its open position as shown in FIGURE 13 in which position the circuit between line 482 is through terminal 464, hot wire receiving stirrup 490, hot wire clamp 500, lead 496, recloser 494, lead 498, hot wire clamp 502, hot wire receiving stirrup 492 and terminal 466 to line 484.

As in the preceding embodiments, when it is the desire to remove the recloser from the circuit, the cut-out fuse 468 is swung in a counterclockwise direction from its position as shown in FIGURE 13 to its closed position as shown in FIGURES 14 and 15 in which position the previously described circuit through recloser 494 is shunted by the cut-out fuse 468. With fuse 468 in its closed position as illustrated in FIGURES 14 and 15, the recloser is manually tripped open and then one of the hot wire clamps 502 or 500 may be unclamped by rotary manipulation of its screw stud, disconnected from the stirrup to which it was connected, and clamp connected to the stud of the other hot wire clamp. The remaining hot wire clamp is then similarly disconnected from the remaining one of the studs 490 or 502 and the connected hot wire clamps are lowered while so inter-connected to the position shown in FIGURE 14. Following completion of maintenance of the recloser 494, the recloser is restored to the circuit between lines 482 and 484 by reversal of the foregoing procedure and substantially is the same manner described in detail previously in connection with the preceding embodiments. It will be noted in reference to FIGURE 14, that while the recloser 494 has been removed from the circuit between lines 482 and 484 for maintenance purposes, the line is overload protected by the fuse 468 and, should the circuit become overloaded, the fuse 468 will operate in the normal manner to interrupt the electrical connection between terminal assemblies 464 and 466 and release the latch 474 to permit the fuse assembly 468 to drop to its open position as illustrated in FIG. 13. The details of construction of this type of fuse are shown and described in detail in U.S. Letters Patent No. 2,674,673 issued April 6, 1954 for High Voltage Expulsion Type Fuse.

Figure 16:
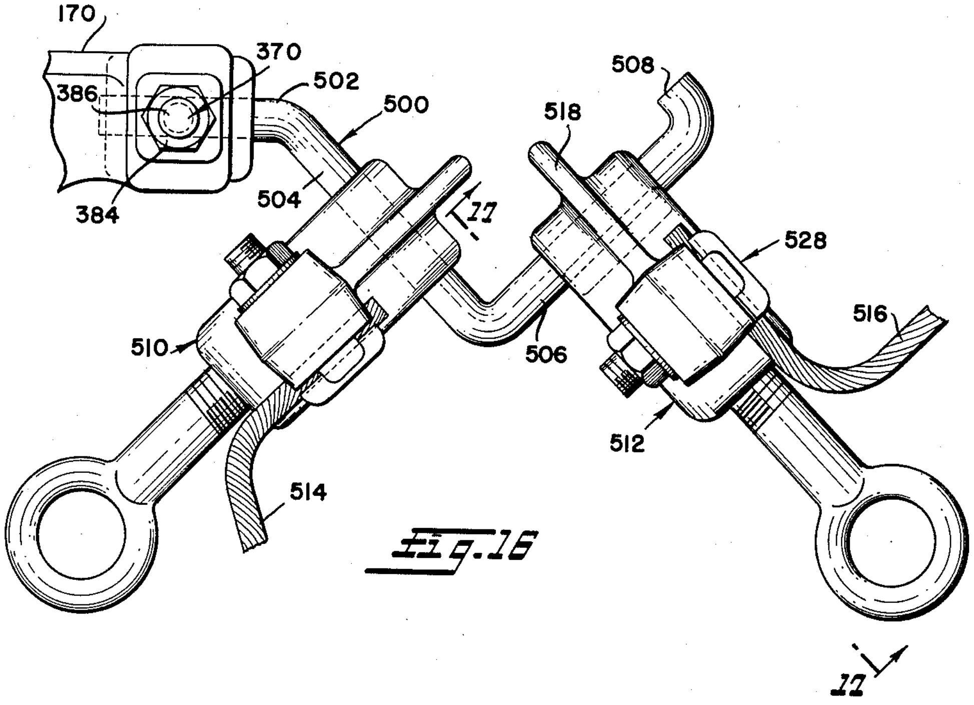
FIGURE 16 is a view similar to FIGURE 11 showing an embodiment of the invention in which both the line and the recloser leads are connected to angularly related portions of a common stirrup by hot wire clamps.
Figure 17:
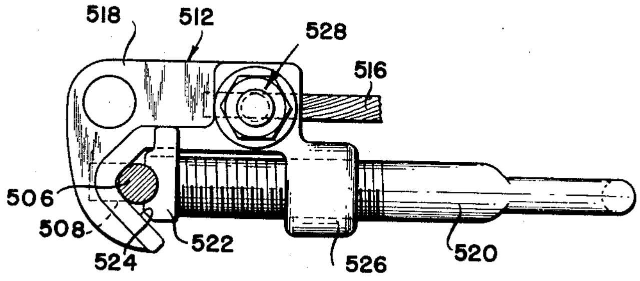
FIGURE 17 is a fragmentary section along the line 17—17 of FIGURE 16.

In certain types of installations it is desirable for the end of the power line as well as the leads from the recloser to be equipped with hot wire clamps. In such event, a single stirrup having distinct clamp receiving portions may be directly clamped in the normal power line end receiving eye bolt in the switch terminals. Such a construction is illustrated in FIGURES 16 and 17 in connection with the terminal 170 of FIGURES 4 and 11. A rigid metallic electrically conductive stirrup 500 having a first portion 502 extending through the eye of and clamped by eye bolt 370 in electrical conductive relation to the terminal 170, a second clamp receiving portion 504 preferably extending at a 45° angle to portion 502 and disposed as shown in a vertical plane inclined at 45° to the horizontal, a third and clamp receiving portion 506 extending at right angles to portion 504 and also disposed in a vertical plane at 45° to the horizontal, and a fourth portion 508 forming an end preventing the clamp from slipping off the end of portion 506. A selectively actuatable open sided screw actuated clamp such as a hot wire clamp 510 may be clamped in electrically conductive relation to portion 504 and a similar clamp 512 may be clamped in electrically conductive relation to portion 506. Clamp 510 is the end terminal clamp for the recloser connected lead 514 and clamp 512 is the end terminal clamp for the power line 516. Either of the clamps 510 and 512 can be operated and removed or attached independently of the other.

Clamps 510 and 512 are identical in form and are illustrative of the structure of typical conventional hot wire clamps as referred to in connection with the previous embodiments. These clamps comprise a main body 518 mounting a screw actuator 520 rotatably connected to a head 522 which is slidable along the body 518 and which with the surface 524 of body 518 defines a jaw in which a wire or stirrup such as 500 can be clamped. That is, screw actuator 520, being threadedly received through the boss 526 of body 518 causes head 522 to approach surface 524 when screw actuator 520 is rotated in one direction and to recede from surface 524 when rotated in the opposite direction the leads such as 516 are fixed to the body 518 by an eye bolt type clamp 528.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power transmission line bypass switch assembly comprising a base member, a pair of switch terminals, insulator means supporting said terminals on said base member in spaced relation, a switch device mounted on one of said terminals and selectively movable relative thereto into and out of engagement with the other of said terminals to establish an electrically conductive path therebetween, means on each of siad terminals permitting clamping of electrical line conductors thereto, and means electrically connected to and supported by each of said terminals and each including a first portion furnishing a connection for an electrically conductive element normally clamped to said first portion and a second portion disposed in spaced relationship to said first portion furnishing a connection for a selectively actuatable, open-sided, electrically conductive clamping element, said last named means being poerative independent of said terminal clamping permitting means whereby electrically conductive clamping elements can be secured to and removed from said portions of said last named means without manipulation of said terminal clamping permitting means.

2. The assembly defined in claim 1 wherein each of said last named means comprises an axially elongated horizontally extending stud having an enlarged head at one end and threadedly engaged with the associated one of said terminals at its opposite end, the diameter of the shank of said stud intermediate said head and said threaded portion being of a diameter such that a hot wire clamp may be readily secured thereto and detached therefrom.

3. The assembly defined in claim 1 wherein said switch device is permanently pivoted on said one terminal.

4. The assembly defined in claim 1 wherein said switch device is detachably pivoted on said one terminal to permit removal thereof.

5. The assembly defined in claim 1 wherein said switch device is a high load capacity switch.

6. The assembly defined in claim 1 wherein said switch device is a cut-out fuse.

7. In combination with a normally service pole mounted circuit device for an electrical power distribution circuit which device must be removed from its circuit for maintenance purposes at frequent intervals, said circuit device having a plurality of external terminals a selectively closable switching device for establishing an electrically conductive path between said terminals, a lead attached to each of said terminals, and a selectively actuatable electrically conductive clamp connected to the free end of each of said leads, at least one of said clamping devices having means thereon whereby the other of said clamping devices may be readily clamped in electrically conductive relation to said one clamping device.

8. In combination defined in claim 7 wherein each of said clamping devices is a screw actuated hot line clamp and wherein said one clamping device has a metal headed stud fixed thereto and projecting from one side thereof transversely of the axis of the clamping screw thereof.

9. A selectively actuatable switching device having its opposite terminals connected to adjacent ends of a normally series connected pair of transmissions lines, said switching device being selectively actuatable to directly connect said lines and normally being open, a circuit device normally interposed in series circuit relation between said adjacent ends of said lines, the terminals of said circuit device each being connected to the terminals of said switch device by leads terminating in selectively actuatable clamps and each of said switch device terminals having clamp receiving portions thereon which are structurally and operatively independent of the connections between said terminals and said line ends and to which said circuit device lead clamps may be selectively connected.

10. The combination defined in claim 9 wherein said clamps are electrically conductive C-shaped screw actuated clamps.

11. The combination defined in claim 9 wherein said circuit device is a recloser.

12. The combination defined in claim 9 wherein said circuit device is a voltage regulator.

13. The combination defined in claim 9 wherein said switching device is a cut-out fuse.

14. A power transmission line bypass switch assembly comprising a base, a pair of terminals supported in electrically insulated relation on said base, and a switch device pivoted on one of said terminals for movement into and out of electrically conductive engagement with the other of said terminals, each of said terminals having a pair of means thereon by which independent electrical connections can be independently made to said terminals, at least one of said means on each of said terminals comprising a metallic member fixed at one end in electrically conductive relation to the associated terminal and having a portion extending away from said terminal in spaced relation thereto and to the remainder of said assembly to provide access to said portion, the cross-section and length of said member portion defining a receiving surface for an electrically conductive selectively actuatable open sided terminal clamp.

15. The combination defined in claim 14 wherein the other of said means is an eye bolt type clamp mounted on the associated terminal and adapted to receive an electrical lead.

16. A power transmission line by-pass switch assembly comprising a base, a pair of terminals supported in electrically insulated relation on said base, and a switch device pivoted on one of said terminals for movement into and out of electrically conductive engagement with the other of said terminals, each of said terminals having a pair of means thereon by which independent electrical connections can be independently made through said terminals, at least one of said means on each of said terminals comprising a metallic member fixed at one end in electrically conductive relation to the associated terminal and having a portion extending away from said terminal in spaced relation thereto, the cross section and length of said member portion defining a receiving surface for an electrically conductive selectively actuatable open sided terminal clamp, the other of said means being a second portion of said metallic member disposed in angularly inclined and spaced relation to the first said portion of said member, the second portion being similar to said first portion in cross section and length to define a second open sided terminal clamp receiving surface.

References Cited in the file of this patent

UNITED STATES PATENTS

| | | |
|---|---|---|
| 1,393,344 | Conrad | Oct. 11, 1921 |
| 1,916,844 | Le Clair et al. | July 4, 1933 |
| 2,031,921 | Bodendieck | Feb. 25, 1936 |
| 2,065,859 | Kirk | Dec. 29, 1936 |
| 2,200,496 | Fox | May 14, 1940 |
| 2,283,061 | Hendley | May 12, 1942 |
| 2,508,778 | Spears | May 23, 1950 |
| 2,668,201 | Welsh | Feb. 2, 1954 |
| 2,671,142 | Lindell | Mar. 2, 1954 |

OTHER REFERENCES

Tips Tool (Catalogue), Supplement Number one, Tips Tool Co., Inc., Taylorville, Ill., Aug. 1936, 16 pages, pages 9 and 11 relied upon.

UNITED STATES PATENT OFFICE

CERTIFICATE OF CORRECTION

Patent No. 3,062,936 November 6, 1962

William H. Gilliland

It is hereby certified that error appears in the above numbered patent requiring correction and that the said Letters Patent should read as corrected below.

Column 5, line 1, for "178" read -- 278 --; column 8, line 40, for "siad" read -- said --; line 49, for "poerative" read -- operative --.

Signed and sealed this 1st day of October 1963.

(SEAL)
Attest:

ERNEST W. SWIDER

Attesting Officer

DAVID L. LADD

Commissioner of Patents